PHASE AND FREQUENCY CORRECTION SYSTEM

Filed May 17, 1965 3 Sheets-Sheet 1

INVENTORS
ROBERT N. HURST &
LEE V. HEDLUND
BY Edward J. Norton
Attorney

PHASE AND FREQUENCY CORRECTION SYSTEM

Filed May 17, 1965 3 Sheets-Sheet 2

INVENTORS:
ROBERT N. HURST &
LEE V. HEDLUND
BY Edward J. Norton
ATTORNEY

INVENTORS
ROBERT N. HURST &
LEE V. HEDLUND
BY Edward J. Norton
ATTORNEY 3,409,736
Patented Nov. 5, 1968

3,409,736

PHASE AND FREQUENCY CORRECTION SYSTEM

Robert N. Hurst, Cherry Hill, and Lee V. Hedlund, Cinnaminson, N.J., assignors to Radio Corporation of America, a corporation of Delaware Filed May 17, 1965, Ser. No. 456,061
13 Claims. (Cl. 178—6.6)

Figures 1, 2:
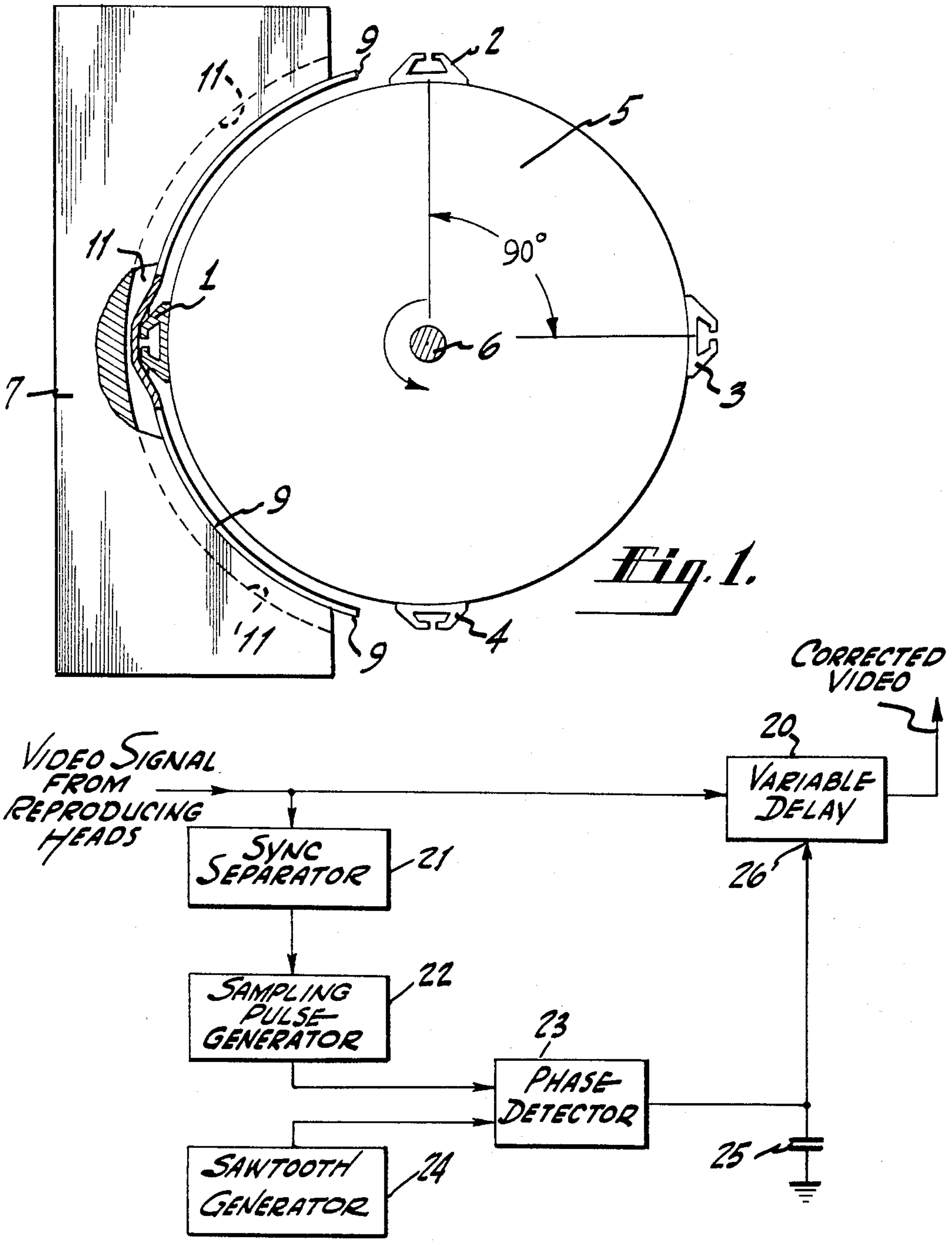
FIG. 1, FIG. 2. PRIOR ART

This invention relates to phase and frequency correction systems and particularly to a novel system for correcting a signal in which phase and frequency errors occur in a periodic manner.

Periodic occurrence of phase and frequency errors in an electrical signal can result whenever the cause of the errors acts on the signal in a periodic manner. For example, in the video tape recording art, recording and reproducing of video signals is often accomplished by sequentially scanning a magnetic tape transversely with a plurality of magnetic heads. If the head-to-tape-contact geometry imposed by the reproducing heads differ from that imposed by the recording heads, then periodic phase and frequency errors will exist in the reproduced signal.

There have been two general approaches to the solution of the problem of periodically occurring phase and frequency errors due to differences in the head-to-tape-contact geometry. One approach is to control the degree to which the tape is stretched by the reproducing head as a result of head-to-tape-contact geometry, either by manual, electromechanical servo, or electronic servo control means. The second approach is to correct the errors in the reproduced signal after it has been read from the tape. The former technique generally involves controlling the position of a vacuum guide which determines the pressure exerted on the tape by the reproducing heads. The position control may be accomplished either by manual adjustment or by an electromechanical servo system. Correction by the second technique is generally accomplished by passing the signal which has been read from the tape through a voltage-variable delay line. The delay of the line is controlled to compensate for errors caused by improper tape stretch. The control voltage for the delay line is generally obtained by measuring the phase error in the horizontal synchronization pulses read from the tape. A voltage proportional to the phase error controls the delay of the line.

Generally, either one or both of the above mentioned correction techniques are used in reproducing the video recording. The results have been adequate where the video is monochrome. However, where the recorded video signal contains color information, the conventional systems do not provide adequate correction. In addition, if no electromechanical servo is employed conditions are even less adequate.

It is therefore an object of the present invention to provide an improved system for correcting phase and frequency errors which occur periodically.

It is a further object of the present invention to provide an improved system for correcting the phase and frequency errors introduced in the reproduction of a video signal because of improper head-to-tape-contact geometry.

A further object of the present invention is to provide a phase and frequency correction system which will allow a faithful reproduction of a color video tape recording.

The correction system of the present invention is in some respects similar to the second type of correction system described above. The signal read from the tape by the reproducing heads is passed through a variable delay line and the delay of the line is controlled to correct any phase or frequency errors. The delay line will correct a constant phase error if a constant voltage of the proper value is applied to the delay line. Correction of a varying phase error, i.e., a frequency error, therefore requires that a varying voltage be applied to the line.

In the conventional correction system the voltage which controls the delay of the line is developed by measuring the phase error in each horizontal sync pulse and generating a voltage proportional to the phase error. The voltage so developed is stored during the period between horizontal sync pulses. As a consequence of the storage, the control voltage remains constant during the period between horizontal sync pulses and the waveform of the control voltage varies in a stepwise manner. Because the control voltage remains constant during the period between horizontal sync pulses any frequency error occurring between horizontal sync pulses is not corrected. The errors resulting from a lack of frequency correction between horizontal sync pulses cannot be visually distinguished on the reproduced picture where the video is monochrome. However, where color is being reproduced a substantial visible error in the hue of the color results.

In contract to the prior art correction system, the correction system of the present invention is capable of providing a continuously varying control voltage for the variable delay line which enables correction of frequency errors occurring between horizontal sync pulses. The control voltage for the variable delay line is established according to the present invention by first developing a control voltage in a manner similar to the conventional system, i.e., a control voltage is developed at each horizontal sync pulse by measuring the phase error of each sync pulse. This control voltage is then either increased or decreased during the intervals between horizontal sync pulses to provide correction for any frequency errors occurring between horizontal sync pulses. In one embodiment of the present invention the rate of increase or decrease in control voltage during the periods between horizontal sync pulses is proportioned to the total phase error occurring after a predetermined number of horizontal sync pulses have occurred. For example, the total phase error after a complete passage of a reproducing head across the video tape may be measured and used to determine the rate of increase or decrease in the control voltage between horizontal sync pulses. In a second embodiment, a closed loop feedback system is employed to sense any stepwise variation in the control voltage and to correct the control voltage to remove the stepwise variation.

Figure 3:
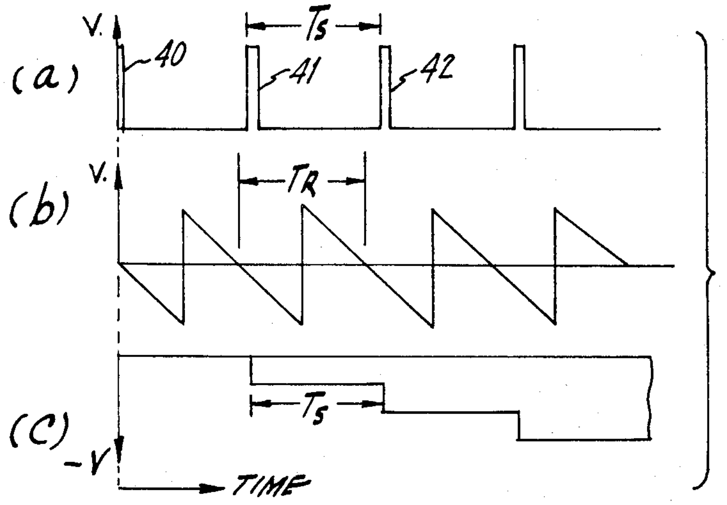
Figure 4:
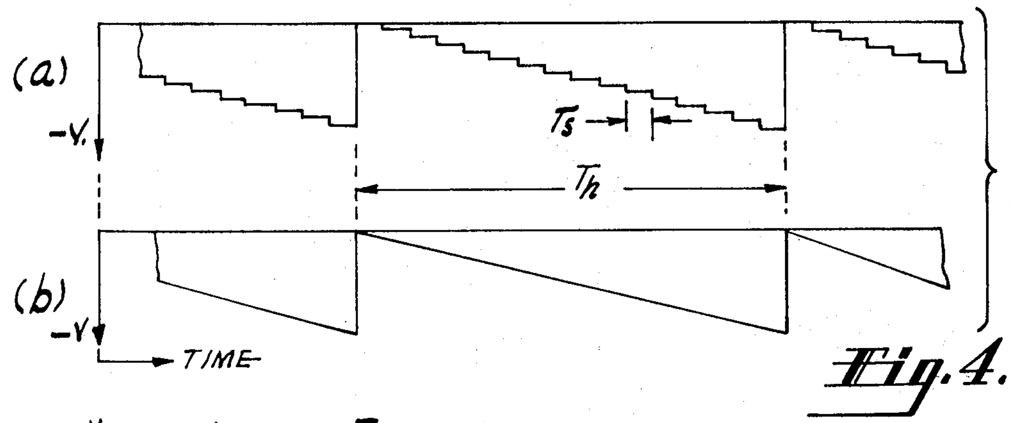
Figure 6:
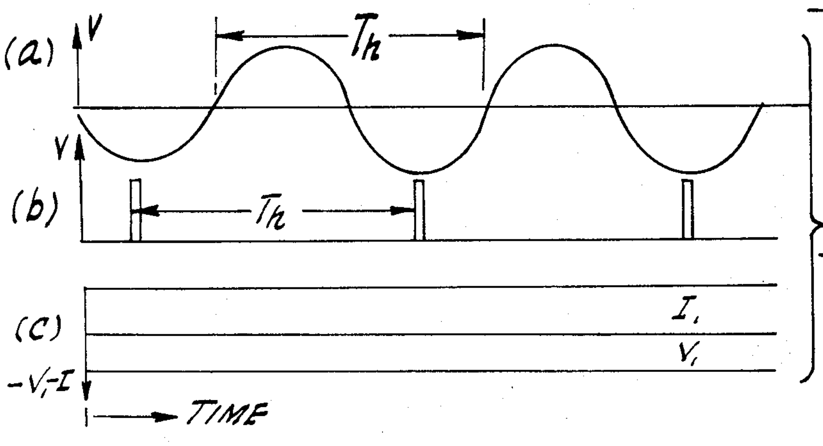
Figure 5:
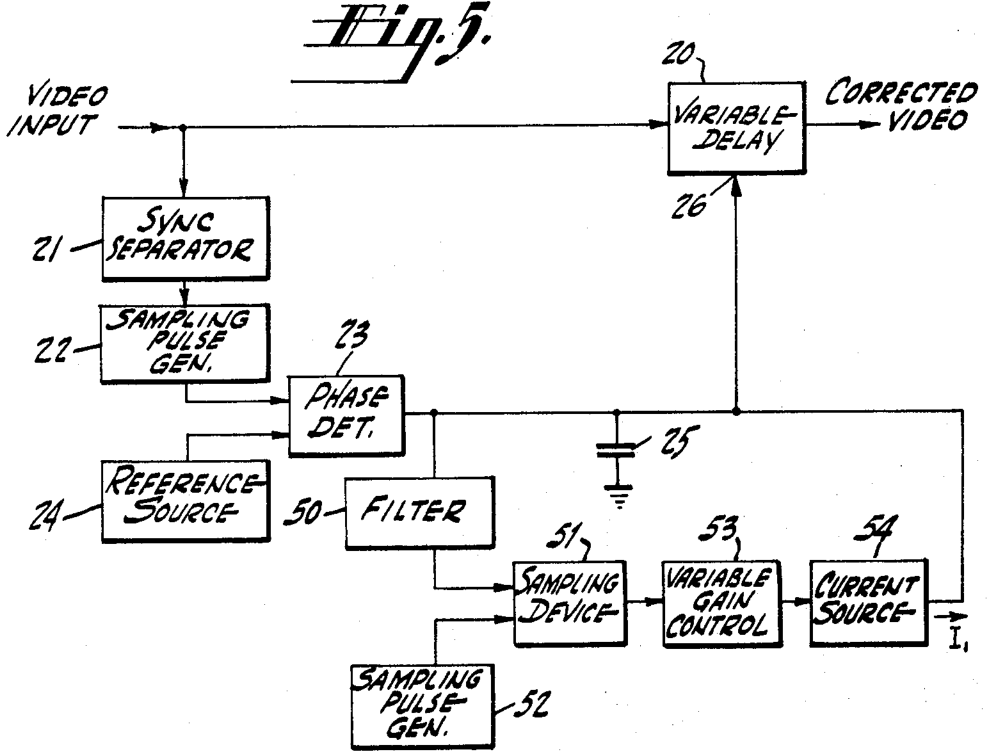
Figure 7:
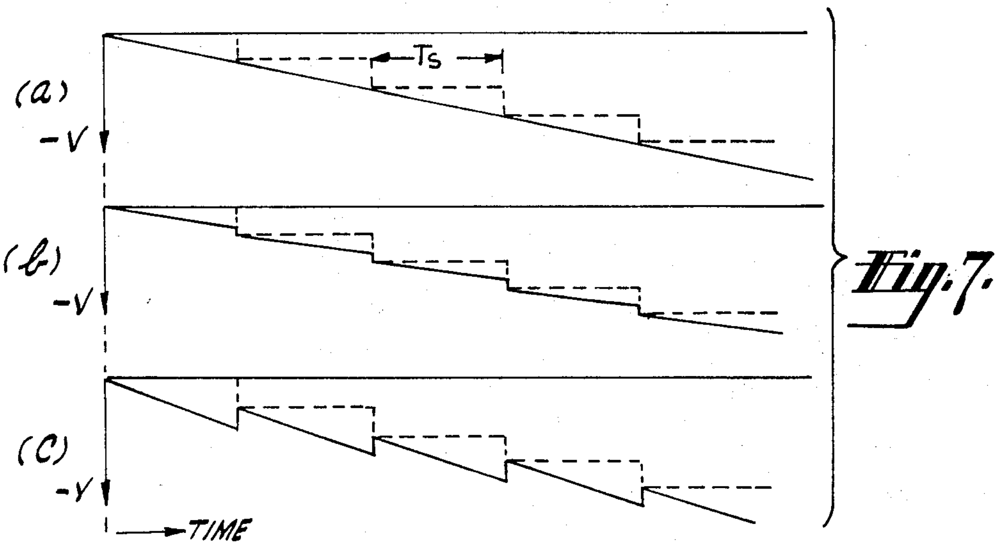

Two embodiments of the present invention will be described with reference to the accompanying drawing in which:

FIG. 1 is a drawing, partially in section, of a head wheel construction used in quadruplex video recording, FIG. 2 is a block diagram of a prior art correction system, FIGS. 3 and 4 are waveforms diagrams used in describing the system of FIG. 2, FIG. 5 is a block diagram of an embodiment of the present invention, FIGS. 6 and 7 are waveform diagrams used in describing the system of FIG. 5.

The invention will be described with respect to its use in video recording systems. Generally, however, the invention may be employed to correct phase and frequency errors which occur periodically in any signal which contains a component at a reference frequency.

Present-day video recording is generally accomplished by a technique which has come to be known as quadruplex recording. The term quadruplex is due to the use of four recording heads spaced 90° apart around a head wheel. FIG. 1 shows a diagram of a conventional quadruplex recording head wheel construction. Four recording heads, 1, 2, 3, and 4 are spaced in quadrature about a wheel 5 which rotates about an axis 6 in the direction indicated.

The relative size of the four recording heads 1, 2, 3 and 4 with respect to the wheel 5 has been exaggerated in the drawing. A vacuum guide 7 is positioned adjacent to one side of the wheel 5. The tape 9 moves between the wheel 5 and the guide 7. In FIG. 1 the direction of the tape motion is parallel to the axis 6 of the head wheel 5, for example, out of paper. As the head wheel 5 rotates in the direction indicated one of the heads contacts the tape and records the video information. As the head passes over the tape, it stretches the tape in order to obtain a good contract. The sectioned portion of FIG. 1 shows how the tape is stretched by the recording head. A groove or slot 11 in the guide 7 accommodates the heads 1, 2, 3 and 4 as they successively scan across the tape 9.

Reproduction of the recorded video information is accomplished by using the same head wheel or a head-wheel construction subsantially identical to that used in recording. Again, four heads are spaced in quadrature around a head wheel and the tape passes between the head wheel and the vacuum guide. If the tape is stretched by the reproducing heads by a greater amount than it was stretched by the recording heads, then the reproduced signal will be at a lower frequency than the recorded signal. Similarly, if less stretch is imposed by the reproducing heads, the reproduced signal will be of a higher frequency than the recorded signal.

The usual technique for recording video information by the quadruplex method is to record approximately sixteen horizontal lines of video during each pass of one recording head transversely across the tape. One line corresponds to one scan of the electron beam from left to right across the video receiver. Included in each line of video information is a horizontal sync pulse which determines the horizontal motion of the electron beam in the video reproducing system. There are, therefore, sixteen horizontal sync pulses spaced across the tape width for each pass of a recording head across the tape width.

If the tape stretch imposed by the reproducing head is greater than that imposed by the recording head then the frequency or repetition rate of the horizontal sync pulses during each sixteen-line group will be less than the proper value. The phase of the horizontal sync pulses will be in error by an amount corresponding to the frequency error. The horizontal sync pulses should occur at a known repetition rate, e.g. 15,750 pulses per second. By generating pulses at a known rate locally, the phase error of the horizontal sync pulses may be measured.

Generally either one of two systems may be used to generate a local reference pulse train. In the first system, a horizontal-rate oscillator is controlled by an AFC technique (using the tape horizontal sync pulses as the control) to produce horizontal-rate pulses whose rate corresponds to the *average* rate coming off the tape. The horizontal rate oscillator output therefore does not show the phase variations at the horizontal sync rate which exist in the tape signal, because the AFC time constant is adjusted to ignore such fast changes. Comparing the horizontal rate oscillator signal against the tape horizontal sync signal yields information about phase variations at rates greater than the cut off frequency of the AFC loop.

The second technique for generating the reference pulse train is to employ an oscillator, which generates pulses at a fixed 15,750 pulse per second rate. This latter technique is preferred where color is being reproduced.

FIG. 2 is a block diagram of a typical prior-art system used to correct phase and frequency errors caused by improper tape stretch. The ground connections for the elements represented by the various blocks have been omitted for the sake of clarity. The video signal from the reproducing heads is supplied to an electronically variable delay unit 20 which may for example be an electronically variable delay line of conventional design. The delay unit 20 has a foltage versus delay characteristic yielding an increasing delay for increasing control voltages and decreasing delays for decreasing control voltages. Other types of delay units may of course, be employed with suitable circuit modifications. Such modifications will be clear to one skilled in the art. The video signal is also supplied to a sync separator 21 of conventional design which separates the horizontal sync signal from the video. The horizontal sync signal from the separator 21 is directed to a sampling pulse generator 22 which generates a short sampling pulse upon the occurrence of each horizontal sync pulse. Typically the sampling pulses will be five microseconds long. The sampling pulses from the generator 22 are directed to one input of a phase detector 23. A sawtooth generator 24 generates a sawtooth wave at the correct horizontal sync frequency e. g., 15,750 cycles per second. The sawtooth wave from the generator 24 is supplied to a second input of the phase detector 23. The output of the phase detector 23 is connected to a memory capacitor 25 and to the control input 26 of the variable delay unit 20. The phase detector 23 may be, by way of example, a conventional diode bridge detector. While the system shown in FIG. 2 employs a sawtooth waveform to detect phase errors, it should be recognized that any suitable phase detection technique may be employed. One alternative would be to use a trapezoid waveform in place of the sawtooth.

In the operation of the prior-art correction system of FIG. 2, phase and frequency errors in the video input signal obtained from the reproducing heads are corrected by passing the video signal through the variable delay unit 20. The delay imposed by the delay unit 20 is proportional to the control voltage supplied to the delay unit 20 from the memory capacitor 25. A fixed frequency error in the video signal is corrected by applying a varying voltage to the delay unit 20. If the frequency of the video signal from the recording heads is greater than the proper value, then an increasing voltage is applied to control the delay unit 20. If the frequency of the video signal is less than the proper value, then a decreasing voltage is applied to control the delay unit 20.

A description of the operation of the system shown in FIG. 2 will be given with reference to the waveforms shown in FIGS. 3 and 4. These waveforms illustrate the operation of the system when the video tape is stretched by the reproducing heads a fixed amount more than it was stretched by the recording heads. In FIG. 3 the waveform labeled A is a voltage-versus-time diagram of the sampling pulses which are applied to the phase detector 23 from the sampling pulse generator 22. The period between the pulses, designated $T_s$, corresponds to the period between the horizontal sync pulses separated from the video signal by the sync separator 21. Each sampling pulse is generated upon the occurrence of a horizontal sync pulse supplied to the generator 22 from the sync separator 21. Waveform B of FIG. 3 is a voltage-versus-time diagram of the waveform applied to the second input of the phase detector 23 from the sawtooth generator 24. The waveform is a sawtooth with a period, designated $T_r$, which is equal to the correct horizontal sync pulse period. The phase of the sawtooth of waveform B is such that the zero axis crossing of the sawtooth occurs at the same time as a sampling pulse generated on the occurrence of a horizontal sync pulse of proper phase. Waveform C of FIG. 3 is a voltage-versus-time diagram of the voltage across the capacitor 25. Note that the voltage is negative. The waveform A of FIG. 4 is also a diagram of the voltage across the capacitor 25, however, the waveform A of FIG. 4 corresponds to a greater period of time than that of waveform C of FIG. 3. The period of the waveform A of FIG. 4, designated $T_h$, corresponds to the time required for a reproducing head to traverse sixteen lines of video information recorded on the tape, i.e., to make one transverse pass across the tape.

If the stretch imposed on the video tape by the reproducing heads is greater than that imposed by the recording heads then the period between the horizontal sync pulses reproduced from the tape will be greater than the correct value. If the amount of tape stretch is constant then the period between the horizontal sync pulses will also be constant corresponding to a constant frequency error or a linearly increasing phase error. As noted above this is the situation represented by the waveforms of FIGS. 3 and 4, i.e., $T_s$ is a fixed amount greater than $T_r$. As one of the four reproducing heads begins to traverse the tape it will read a first horizontal sync pulse which we will assume is in phase. The sampling pulse generated upon the occurrence of this horizontal sync pulse will occur at a time corresponding to a zero axis crossing of the sawtooth waveform shown by B in FIG. 3. The sampling pulse 40 in waveform A of FIG. 3 represents such a pulse. Thus, the time at which the sampling pulse 40 is generated corresponds to the time at which the sawtooth of waveform B, FIG. 3, crosses the zero axis. The phase detector 23 samples the sawtooth wave when the pulse 40 occurs, and therefore the output of the phase detector 23 will be zero as shown in waveform C of FIG. 3. Since no voltage appears at the output of the phase detector 23 the voltage across the capacitor 25 will remain at zero until the next sampling pulse 41 is generated. Since the period between the sampling pulses is greater than the period of the sawtooth, a negative voltage which is proportional to the phase error will appear at the output of the phase detector 23 when the sampling pulse 41 is generated. This negative voltage is stored by the memory capacitor 25. Thus, as shown in C of FIG. 3, the voltage across the capacitor 25 decreases to a negative value. The voltage across the capacitor 25 will remain at this voltage level until the next sampling pulse is generated. When the sampling pulse 42 is generated the sawtooth is sampled at a lower voltage level, the phase error being greater, resulting in a lower voltage generated by the phase detector 23 and stored by the capacitor 25. The voltage across the capacitor 25 decreases in a stepwise manner until a sampling pulse again occurs at the zero axis crossing of the sawtooth. Since sixteen horizontal sync pulses are recorded for every transverse pass of the recording head across the tape the waveform appearing across the capacitor 25 will have sixteen steps. After the reproducing head has left the tape and another reproducing head begins to scan the tape the first horizontal sync pulse reproduced by the second head will again generate a sampling pulse which is the same phase as the first pulse of the preceding 16-line group, for example in phase and occurring at the zero axis crossing of the sawtooth. When this condition occurs the capacitor 25 discharges into the phase detector 23 and the voltage across the capacitor 25 goes to zero.

Waveform A of FIG. 4 shows the voltage across the capacitor 25 for a longer period of time than is indicated in waveform C of FIG. 3. The voltage across the capacitor 25 thus decreases in a stepwise manner for sixteen steps for each passage of a reproducing head across the tape. At the end of the sixteen steps the capacitor voltage goes to zero in accordance with the output of the phase detector 23. The waveform A of FIG. 4 forms the control voltage for the variable delay unit 20. Thus the video signal supplied to the variable delay unit 20 is corrected in a stepwise manner.

It should be noted that no frequency correction takes place between the horizontal sync pulses because the voltage supplied to the delay unit 20 is constant during this interval. The errors resulting from a lack of frequency correction between horizontal sync pulses generally create no problem where the reproduced video is monochrome. There is a slight error which causes a horizontal stretching of the television picture due to the lack of correction between horizontal sync pulses but this error cannot be perceived by the human eye. However, where color video is being reproduced the errors resulting from a lack of frequency correction between horizontal sync pulses results in a substantial hue error which is highly visible. This error results from the fact that the color information is carried as a phase modulation of a subcarrier contained in the reproduced video signal. The constant frequency error between the horizontal sync pulses results in a linearly varying phase error in the color information component. This varying phase error causes a substantial hue shift from left to right across the television picture. While the color will be correct on the left side of the picture there will be an increasing error in the color from left to right across the picture. To accomplish phase correction of the color component it is necessary to provide a continuously varying voltage to the delay unit 20. The control voltage necessary to accomplish color correction in the example cited, i.e. where there is a fixed amount of improper tape stretch, is shown in waveform B of FIG. 4. The present invention provides this type of correction.

FIG. 5 is a block diagram of an embodiment of the present invention. The ground connections of the elements represented by the blocks have been omitted for the sake of clarity. This system includes all the elements of the conventional prior art correction system described above. The same numbers used in describing the elements of the prior art correction system of FIG. 2 are used in FIG. 5 for corresponding elements. In addition to the elements of the conventional system this embodiment of the present invention includes a filter 50 which removes a preselected frequency component from the voltage appearing across the capacitor 25. The selection of the particular frequency component removed by the filter 50 will be described more fully below. The output of the filter 50 is supplied to a first input of a sampling device 51 which may for example be a conventional diode bridge sampler plus a memory capacitor. A sampling pulse generator 52 supplies sampling pulses at a frequency equal to the frequency of the component removed by the filter 50 to a second input of the sampling device 51. The output of the sampling device 51 is supplied to a variable gain control 53 which by way of example may be a conventional variable resistor attenuator. The output of the variable gain control 53 is supplied to a current source 54. The current source 54 delivers a current to the memory capacitor 25. The amount of current is determined by the voltage supplied to the current source 54 from the gain control 53. The current source 54 may for example be a conventional transistor current source.

In the operation of the correction system of FIG. 5, the filter 50 is tuned to select one of two major frequency components of the signal appearing across the capacitor 25. One manner of operation occurs when the filter 50 removes a component whose frequency corresponds to the frequency of the waveform A of FIG. 4, i.e., the frequency corresponding to the period $T_h$. The amplitude of this frequency component is directly related in magnitude and polarity to the correction voltage produced across the capacitor 25. The remainder of the system operates to change the voltage across the memory capacitor 25 during the periods between horizontal sync pulses at a rate determined by the magnitude of the component removed by the filter 50.

The sampling pulse generator 52 generates a train of sampling pulses at a rate equal to the frequency of the component passed by the filter 50. The phase relationship of the sampling pulses with respect to the component passed by the filter 50 is such that sampling occurs at a positive or negative peak of the component passed by the filter 50 depending upon the polarity of the error. The sampling device 51 then produces an output voltage which is directly related in magnitude and polarity to the error voltage appearing across the capacitor 25. This output voltage is applied to the current source 54 through the gain control 53. The amount of current applied to the capacitor 25 from the current source 54 is directly related to the magnitude of the voltage developed at the output of the sampling device 51. The variable gain control 53 is provided to adjust the value of voltage applied to the current source 54 to the proper value.

A more detailed explanation of the system shown in FIG. 5 will be given with reference to the waveforms shown in FIGS. 6 and 7. These waveforms illustrate the operation of the present correction system under conditions similar to those described above, i.e., the tape is stretched by the reproducing heads a fixed degree more than the tape was stretched by the recording heads. In FIG. 6, A is a voltage-versus-time diagram of the waveform appearing at the output of the filter 50. The waveform A is a sinusoid of period $T_h$ which corresponds to the period of the control voltage shown in FIG. 4. Waveform B of FIG. 6 is a voltage-versus-time diagram of the sampling pulses appearing at the output of the reference source 52. Waveform C of FIG. 6 is a voltage and current versus time diagram of the voltage appearing at the output of the sampling device 51, indicated $V_1$, and the current output of the current source 54 indicated $I_1$. Note that both $V_1$ and $I_1$ are negative. FIG. 7 includes three waveforms each illustrating the voltage across the capacitor 25 for a different operating condition. Waveform A is a voltage-versus-time diagram of the waveform appearing across the capacitor 25 under proper operating conditions. The dotted line is the waveform of the voltage appearing across the capacitor 25 in the absence of the present correction system. The solid line in the waveform appearing across the capacitor 25 when the system of the present invention is employed. Waveforms B and C are also voltage-versus-time diagrams of the waveform appearing across the capacitor 25 where the dotted line waveform is the same as that shown in A. The solid line waveforms of B and C represent the voltage appearing across the capacitor 25 when the variable gain control 53 is improperly adjusted. Note that the voltages shown in the three waveforms of FIG. 7 are negative voltages.

As shown by the waveform A of FIG. 6, the voltage at the output of the filter 50 is a sinusoidal voltage of period $T_h$, where $T_h$ is the period of the correction voltage supplied to the variable delay unit. In other words $T_h$ is the period of the waveforms shown in FIG. 4. The amplitude of the sinusoid of waveform A, FIG. 6, is directly related to the maximum value of the correction voltage appearing across the capacitor 25. The generator 52 generates sampling pulses as shown in waveform B, FIG. 6, at a frequency equal to the frequency of the sinusoidal voltage at the output of the filter 50, i.e., the period between sampling pulses is $T_h$. The sampling pulses generated appear at the minimum values of the sinusoid shown in waveform A, FIG. 6. The sampling device 51 therefore samples the sinusoid of waveform A at its minimum values and produces an output voltage $V_1$ corresponding to the magnitude of the sinusoid. The output voltage $V_1$ of the sampling device 51 is therefore a constant value as indicated in waveform C, FIG. 6. The current output $I_1$ of the current source 54 is proportional to the voltage at the output of the sampling device 51 and is therefore a constant value as indicated in waveform C, FIG. 6. Therefore, the current $I_1$ is proportional to the maximum phase error in each sixteen line group of video signal.

The solid line of waveform A of FIG. 7 represents the voltage appearing across the memory capacitor 25. This voltage is determined in part by the phase detector 23 and in part by the output of the current source 54. The current source 54 supplies current to the memory capacitor 25 to produce the solid line voltage of waveform A, FIG. 7. As shown by waveform C, FIG. 6, a constant negative current is supplied from the source 54. Since the rate of change in the capacitor voltage is proportional to the current supplied by the current source 54 the voltage across the capacitor 25 varies linearly during the period $T_s$ as indicated in waveform A of FIG. 7. With the variable gain control 53 properly adjusted the waveform appearing across the capacitor 25, over a longer period of time than is indicated in waveform A, FIG. 7, is the same as the waveform B of FIG. 4. Since there is a linear decrease in the control voltage applied to the variable delay unit 20, the frequency and phase errors in the video signal are corrected between horizontal sync pulses.

Waveform B of FIG. 7 shows the condition where the current supplied to the capacitor 25 is lower than its proper value. In this case the current supplied to the capacitor 25 during the period $T_s$ between horizontal sync pulses is insufficient to bring the voltage across the capacitor to its proper value. Thus, there is still a slight step in the solid line waveform. Waveform C of FIG. 7 shows the condition existing when too much current is supplied to the capacitor 25 between horizontal sync pulses. In this case the voltage across the capacitor 25 is decreased to the proper value on the occurrence of each step produced by the phase detector 23. By properly adjusting the variable gain control 53 the correct waveform indicated in waveform A of FIG. 7 is obtained. When the waveform A is obtained, proper phase correction between horizontal sync pulses is obtained and there is no phase error in the color information component of the video signal.

A second manner of operation of the present system occurs when the filter 50 selects from the voltage appearing across the capacitor 25 a component whose frequency is equal to the frequency of the horizontal sync signal read from the tape. The sampling pulse generator 52 supplies sampling pulses to the sampling device 51 at the same frequency as the signal passed by the filter 50. The phase of the sampling pulses with respect to the filtered component is such that sampling occurs at the maximum or minimum portion of the filtered component. The output of the sampling device 51 is therefore proportional to the amplitude of the component removed by the filter 50. The current source 54 supplies a current to the memory capacitor 25 which current is proportional to the amplitude of the filtered component.

When the correction system operates in the second manner, it acts to remove any stepwise variation in the control voltage appearing across the capacitor 25. This is distinguishable from the first manner of operation described in that in that case the correction is based on the phase error for a sixteen line interval rather than for each line, and some residual stepwise variation in the corrected error signal can remain under certain conditions. The stepwise variation in the control voltage associated with the conventional system occurs at the horizontal sync rate as shown in waveform A of FIG. 4. Following the teaching of the invention, if there is any stepwise variation at the horizontal sync rate, the filter 50 will select a component at this frequency and the current source 54 will supply current to the capacitor 25 to reduce the component at this frequency appearing across the capacitor 25 to a negligible value. With the stepwise variation removed, the ideal correction voltage is obtained and complete phase and frequency correction is accomplished.

In the above description of the present invention it was assumed that the reproducing heads stretched the tape by a fixed degree more than the recording heads. It should be noted that the present invention is not limited to such an operating condition but in general the invention may be employed wherever frequency or phase errors periodically occur in the signal to be corrected, including for example conditions where the reproducing heads of a tape machine stretch the tape by a lesser amount than the recording heads, or where there is a varying difference in head-to-tape geometry between record and reproduce.

What is claimed is:

1. A system for correcting frequency and phase errors in a signal of the type containing a component occurring at a reference frequency, said system comprising:

(a) a variable delay means for delaying said signal in proportion to a control signal applied to said variable delay means,
(b) phase detecting means for periodically measuring the phase error of said component occurring at said reference frequency and for generating an error signal related to said phase error,
(c) means responsive to said error signal for changing said error signal during the period between measurements, said change occurring at a rate determined by the phase error measured by said phase detecting means, and
(d) means for applying said error signal to said variable delay means to control the delay of said variable delay means.

2. A system for correcting frequency and phase errors in a signal of the type containing a component occurring at a reference frequency, said system comprising:
(a) a variable delay means for delaying said signal in proportion to a control signal applied to said variable delay means,
(b) phase detecting means for periodically measuring the phase error of said component occurring at said reference frequency and for generating an error signal related to said phase error,
(c) means responsive to said error signal for changing said error signal during the period between measurements so that any variation in said error signal at the frequency of said component is reduced to a negligible value, and
(d) means for applying said error signal to said variable delay means to control the delay of said variable delay means.

3. A system for correcting frequency and phase errors in a signal of the type containing a component occurring at a reference frequency, said system comprising:
(a) a variable delay means for delaying said signal in proportion to a control signal applied to said variable delay means,
(b) phase detecting means for periodically measuring the phase error of said component occurring at said reference frequency and for generating an error signal related to said phase error,
(c) means responsive to said error signal for changing said error signal during the period between measurements at a rate determined by the value of said error signal at a predetermined time during each period of said error signal, and
(d) means for applying said error signal to said variable delay means to control the delay of said variable delay means.

4. A system for correcting phase and frequency errors in a signal of the type containing pulses occurring at a reference rate where phase and frequency errors periodically occur in said signal, said system comprising:
(a) a variable delay means for delaying said signal in proportion to a control signal applied to said variable delay means,
(b) means for measuring the phase errors of said pulses occurring at said reference rate, and for generating an error signal related to the phase error of said pulses upon the occurrence of each of said pulses,
(c) means for storing said error signal during the period between said pulses,
(d) means responsive to said error signal for changing said error signal during the period between said pulses at a rate determined by the maximum phase error existing in said pulses during the period of said errors, and
(e) means for applying said error signal to said variable delay means to control the delay of said variable delay means.

5. A system for correcting phase and frequency errors in a signal of the type containing pulses occurring at a reference rate where phase and frequency errors periodically occur in said signal, said system comprising:
(a) a variable delay means for delaying said signal in proportion to a control signal applied to said variable delay means,
(b) means for measuring the phase errors of said pulses occurring at said reference rate, and for generating an error signal related to the phase error of said pulses upon the occurrence of each of said pulses,
(c) means for storing said error signal during the period between said pulses,
(d) means responsive to said error signal for changing said error signal during the period between said pulses to reduce any component in said error signal at the frequency of said pulses to a negligible value, and
(e) means for applying said error signal to said variable delay means to control the delay of said variable delay means.

6. A system for correcting phase and frequency errors in a video signal containing a train of horizontal synchronization pulses, said system comprising:
(a) a voltage variable delay line for delaying said video signal by an amount proportional to the value of a control voltage applied to said variable delay line,
(b) means for measuring the phase error in each of said horizontal synchronization pulses upon the occurrence of each of said pulses and for generating an error voltage proportional to said phase error,
(c) means for storing said error voltage between horizontal synchronization pulses,
(d) means responsive to said error voltage for changing said error voltage between horizontal synchronization pulses at a rate periodically determined by the value of said error voltage, and
(e) means for applying said error voltage to said variable delay line for controlling the delay introduced by said variable delay line.

7. A system for correcting phase and frequency errors in a video signal containing a train of horizontal synchronization pulses, said system comprising:
(a) a voltage-variable delay line for delaying said video signal by an amount proportional to the value of a control voltage applied to said variable delay line,
(b) means for measuring the phase error in each of said horizontal-synchronization pulses upon the occurrence of each of said pulses and for generating an error voltage proportional to said measured phase error,
(c) means for storing said error voltage between horizontal-synchronization pulses,
(d) feedback means responsive to said error voltage for changing said error voltage between horizontal synchronization pulses so that any component at the frequency of said horizontal synchronization pulses in said error voltage is reduced to a negligible value, and
(e) means for applying said error voltage to said variable delay line for controlling the delay introduced by said variable delay line.

8. In a system for reproducing a video signal including horizontal-synchronization pulses from a magnetic tape, said system including a plurality of reproducing heads which move transversely across the tape as the tape moves lengthwise past the reproducing heads, a correction system for correcting phase and frequency errors in the reproduced video signal said correction system comprising:
(a) a variable delay line for delaying said video signal reproduced by said reproducing heads by an amount proportional to a control voltage supplied to said variable delay line, (b) means for measuring the phase error in said horizontal synchronization pulses and for generating an error voltage proportional to said phase error, (c) means for storing said error voltage between horizontal-synchronization pulses, (d) means responsive to said error voltage for changing said error voltage during the period between horizontal synchronization pulses at a rate periodically determined by the value of said error voltage at a time corresponding to a predetermined position of said reproducing heads on said tape, and (e) means for applying said changed error voltage to said variable delay line for controlling the delay induced by said line in said video signal.

9. In a system for reproducing a video signal including horizontal-synchronization pulses from a magnetic tape, said system including a plurality of reproducing heads which move transversely across the tape as the tape moves lengthwise past the reproducing heads, a correction system for correcting phase and frequency errors in the reproduced video signal said correction system comprising:

(a) a variable delay line for delaying said video signal reproduced by said reproducing heads by an amount proportional to a control voltage supplied to said variable delay line, (b) means for measuring the phase error in said horizontal synchronization pulses and for generating an error voltage proportional to said phase error, upon the occurrence of each of said horizontal synchronization pulses, (c) means for storing said error voltage between horizontal synchronization pulses, (d) means responsive to said error voltage for changing said stored error voltage so that any component at a frequency equal to the frequency of said horizontal synchronization pulses in said error voltage is reduced to a negligible value, and (e) means for applying said changed stored error voltage to said variable delay line for controlling the delay induced by said line in said video signal.

10. In a system for reproducing a video signal including horizontal synchronization pulses from a magnetic tape, said system including a plurality of reproducing heads which move transversely across the tape as the tape moves lengthwise past the reproducing heads, a correction system for correcting phase and frequency errors in the reproduced video signal said correction system comprising:

(a) a variable delay line for delaying said video signal reproduced by said reproducing heads by an amount proportional to a control voltage applied to said variable delay line, (b) means for measuring the phase error in said horizontal synchronization pulses and for generating an error voltage proportional to said phase error upon the occurrence of each of said pulses, (c) means for storing said error voltage during the period between horizontal synchronization pulses, (d) means for filtering a predetermined frequency component from said stored voltage, (e) means for periodically sampling said filtered component at a time corresponding to a predetermined position of said reproducing heads on said tape, (f) means for changing the voltage stored by said storing means during the period between horizontal synchronization pulses at a rate determined by the magnitude of said sampled signal, and (g) means for applying said changed stored voltage to said variable delay line to control the delay induced in said video signal by said variable delay line.

11. In a system for reproducing a video signal including horizontal synchronization pulses from a magnetic tape, said system including a plurality of reproducing heads which move transversely across the tape as the tape moves lengthwise past the reproducing heads, a correction system for correcting phase and frequency errors in the reproduced video signal said correction system comprising:

(a) a variable delay line for delaying said video signal reproduced by said reproducing heads by an amount proportional to a voltage applied to said variable delay line, (b) measuring means for measuring the phase error in said horizontal synchronization pulses and for generating an error voltage proportional to said phase error upon the occurrence of each of said pulses, (c) means for storing said error voltage during the period between horizontal synchronization pulses, (d) means for filtering a frequency component from the voltage stored by said storing means, the frequency of said filtered component being equal to the frequency of occurrence of said horizontal synchronization pulses, (e) measuring means for measuring the magnitude and direction of said filtered component and for producing an output signal related to said measurement, (f) means responsive to the output of said measuring means for changing said stored voltage signal so that the component of said stored voltage at said horizontal synchronization frequency is reduced to a negligible value, and (g) means for applying said changed stored voltage to said variable delay line to control the delay introduced in said video signal by said variable delay line.

12. In a system for reproducing a video signal including horizontal synchronization pulses from a magnetic tape, said system including a plurality of reproducing heads which move transversely across the tape as the tape moves lengthwise past the reproducing heads, a correction system for correcting phase and frequency errors in the reproduced video signal said correction system comprising:

(a) a variable delay line for delaying said video signal reproduced by said reproducing heads by an amount proportional to a voltage applied to said variable delay line, (b) measuring means for measuring the phase error in said horizontal synchronization pulses and for generating an error voltage proportional to said phase error, upon the occurrence of each of said pulses, (c) a storage capacitor coupled to the output of said measuring means for storing said error voltage during the periods between said measurements, (d) a filter connected to said storage capacitor for filtering a component whose frequency is equal to the frequency of said error voltage from the voltage across said capacitor, (e) sampling means for sampling said filtered component at a rate equal to the frequency of said filtered component and for producing an output voltage proportional to the amplitude of said filtered component, (f) a current source responsive to the output of said sampling means for supplying a current proportional to the output voltage of said sampling means to said capacitor, and (g) means for applying the voltage across said capacitor to said variable delay means to control the delay thereof.

13. In a system for reproducing a video signal including horizontal synchronization pulses from a magnetic tape, said system including a plurality of reproducing heads which move transversely across the tape as the tape moves lengthwise past the reproducing heads, a correcrection system for correcting phase and frequency errors in the reproduced video signal said correction system comprising:

(a) a variable delay line for delaying said video signal reproduced by said reproducing heads by an amount proportional to a voltage applied to said variable delay line, (b) measuring means for measuring the phase error in said horizontal synchronization pulses and for generating an error voltage proportional to said phase error upon the occurrence of each of said pulses, (c) a storage capacitor coupled to the output of said measuring means for storing said error voltage during the periods between said measurements, (d) a filter connected to said storage capacitor for filtering a component whose frequency is equal to the frequency of said horizontal synchronization pulses from the voltage across said capacitor, (e) sampling means for sampling said filtered component at a rate equal to the frequency of said filtered component and for producing an output voltage proportional to the amplitude of said filtered component, (f) a current source responsive to the output of said sampling means for supplying a current proportional to the output voltage of said sampling means to said capacitor, and (g) means for applying the voltage across said capacitor to said variable delay means to control the delay thereof.

References Cited

UNITED STATES PATENTS 3,235,662 2/1966 Bopp -------------- 178—6.6

ROBERT L. GRIFFIN, *Primary Examiner.*

H. W. BRITTON, *Assistant Examiner.*